United States Patent [19]

Setala et al.

[11] 4,266,512
[45] May 12, 1981

[54] APPARATUS FOR THE VAPORIZATION OF ELEMENTAL SULFUR BY MEANS OF CARRIER GAS

[75] Inventors: Pekka T. Setala; Simo A. I. Makipirtti, both of Nakkila; Heimo J. Heino, Pori, all of Finland

[73] Assignee: Outokumpu Oy, Helsinki, Finland

[21] Appl. No.: 52,188

[22] Filed: Jun. 26, 1979

Related U.S. Application Data

[63] Continuation-in-part of Ser. No. 973,433, Dec. 26, 1978.

[51] Int. Cl.³ .................................................. F22B 37/00
[52] U.S. Cl. ................................... 122/5.5 R; 423/543
[58] Field of Search ................ 122/5.5, 5.5 A; 431/4; 423/543

[56] References Cited

U.S. PATENT DOCUMENTS

| | | | |
|---|---|---|---|
| 2,233,675 | 3/1941 | Harten | 122/5.5 A |
| 2,595,447 | 5/1952 | Braun | 423/543 |
| 2,637,630 | 5/1953 | Houston | 423/543 |
| 2,726,933 | 12/1955 | Merriam et al. | 423/543 |
| 3,041,274 | 6/1962 | Love et al. | 122/5.5 A |
| 3,212,553 | 10/1965 | Cathala | 431/10 |
| 3,924,648 | 12/1975 | Etter | 431/4 X |
| 3,993,429 | 11/1976 | Archer | 431/10 X |

Primary Examiner—Edward G. Favors
Attorney, Agent, or Firm—Brooks, Haidt, Haffner & Delahunty

[57] ABSTRACT

An apparatus for the vaporization of elemental sulfur by means of carrier gas, the apparatus comprising a first thermally insulated vessel for the melting of elemental sulfur, provided with a heating means, a stirrer and an inlet pipe for elemental sulfur, and at least one second vessel inside the first vessel and communicating vessel with it, and provided with heating means, a stirrer, means for feeding carrier gas and an outlet pipe for sulfur vapors, and optionally also provided with thermal insulation, for vaporizing the molten elemental sulfur flowing from the former vessel by means of carrier gas.

5 Claims, 1 Drawing Figure

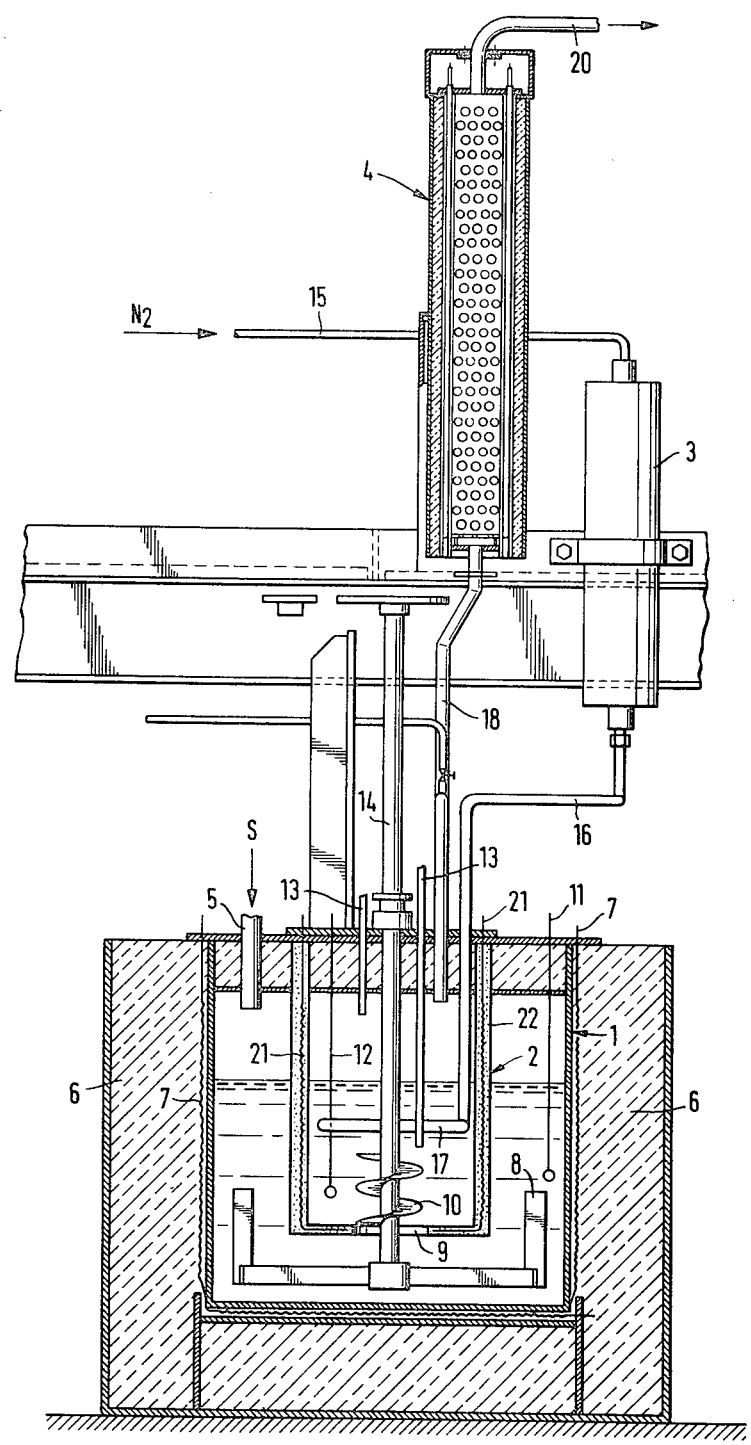

APPARATUS FOR THE VAPORIZATION OF ELEMENTAL SULFUR BY MEANS OF CARRIER GAS

CROSS-REFERENCE TO RELATED APPLICATION

This application is a continuation in part of application Ser. No. 973,433 filed Dec. 26, 1978.

BACKGROUND OF THE INVENTION

The present invention relates to an apparatus for the vaporization of elemental sulfur by means of carrier gas, and especially to an apparatus which has a thermally insulated vessel for the melting of elemental sulfur, provided with heating devices, a stirrer, and a feed pipe for elemental sulfur, and at least one other vessel, provided with heating devices, a stirrer, a feeding member for carrier gas and an outlet pipe for sulfur vapors, and possibly also provided with thermal insulation, for the vaporization, by means of carrier gas, of the molten elemental sulfur emerging from the former vessel.

Conventional vaporizers usually operate at a high temperature and pressure (pressure vessel) in relation to the vaporization point of the substance to be vaporized. The most simple industrially used vaporizer is a boiler heated by means of electricity fuel gas vapor, in which the temperature of the liquid to be vaporized is raised to the boiling point or above it (pressure vessel). Owing to the small heat transfer area the vaporization efficiency of the apparatus is relatively low. Further, when a high temperature gradient is used, a vapor film inhibiting the transfer of heat is easily formed.

Most industrially used vaporizers are various types of pipe, cell or lamella vaporizers in which the heat transfer area has been increased by the implementation of various structures. The liquid to be vaporized can be either inside or outside the pipes.

In the apparatus for the production of sulfur vapor according to U.S. Pat. No. 2,582,794, molten sulfur at the boiling point is pumped into a separate vaporizer heated by means of fuel gases, and sulfur is heated in this vaporizer in a bundle of pipes.

The production of elemental sulfur vapor by means of carrier gas is a commonly used vaporization method in connection with phase-equilibrium determinations performed at a controlled partial pressure of sulfur. In the apparatuses according to U.S. Pat. Nos. 2,595,447 and 2,637,630, preheated air or oxygen is introduced into molten sulfur in order to burn the sulfur, forming sulfur dioxide, whereby elemental vapor is vaporized from the molten sulfur. The above-mentioned prior known apparatuses for the vaporization of elemental sulfur have relatively high purchase price and operating costs. Pressure vessels are known to be expensive, and thermal losses from several separate containers can be relatively high in spite of good thermal insulation. The space requirement of these prior known apparatuses is also relatively large.

The object of the present invention is thus to provide an apparatus which is simpler and more economical in terms of energy than the previous apparatuses for the vaporization of elemental sulfur by means of carrier gas; an apparatus by means of which it is possible to produce elemental sulfur vapor of a high partial pressure for various sulfidization processes to be carried out in solid or molten state.

SUMMARY OF THE INVENTION

According to the present invention there is provided an apparatus comprising two vessels which can be heated separately and are situated one inside the other. The elemental sulfur is fed in solid or molten state into the outer vessel, the temperature of which is considerably below the boiling point of sulfur. The inner vessel is a vaporizer which has external thermal insulation and constitutes a communicating vessel with the outer one. The sulfur is vaporized in the inner vessel by saturating a preheated carrier gas with molten sulfur. The obtained sulfur vapor is directed into a heating device, where it is heated to the desired temperature and the desired degree of dissociation. The apparatus according to the invention operates at a temperature which is low in relation to the boiling point of sulfur, and at normal pressure.

The production of saturated sulfur vapor in an apparatus according to the invention can be controlled by means of the following equations (T/K): The vapor pressure of molten sulfur is of the form:

$$\text{Log}(Ps_x/\text{atm}) = -6109.6411/T + 16.64157 - 17.05358 \times 10^{-3}T + 7.9769 \times 10^{-6}T^2. \quad (1)$$

The average molecular weight $\overline{(MW)}$ of sulfur vapor in equilibrium with the molten sulfur within the temperature range 600–800 K is obtained from the approximate equation $$\overline{MW} = 217.455 - [T-650] \times 10^{-3} \times 98.757, \text{ kg/kmol}. \quad (2)$$

Within the corresponding temperature range the total heat content of saturated sulfur vapor is of the form $$\Delta He \times f = 35.0372 \cdot 10^{-3} \times T + 13.3623 + [11.2 - 20 - 17.689 \times 10^{-3} \times T][T-650 \text{ K}] \times 10^{-3}$$
Mcal/kmol.

Within the temperature range 440–718 K the heat content of molten sulfur is $$\Delta He = -190.525 \times 10^{-3}T + 215.335 \times 10^{-6}T^2 - 66.062 \times 10^3 T^{-1} + 237.081 \text{ Kcal/kg}.$$

Owing to the very poor heat conductivity of molten sulfur (e.g. $\lambda 400°$ C. $\approx 0.2$ Kcal/mh K), the temperature in the outer vessel can be maintained considerably below the temperature in the inner vessel. In order to achieve sufficient transfer of heat the sulfur melt must be stirred effectively in both vessels.

The partial pressure and quantity of the sulfur vapor obtained are controlled by adjusting the temperature and quantity of the carrier gas. If the preheating temperature of the carrier gas is considerably above the temperature of the sulfur bath, the partial pressure of the sulfur vapor obtained can be one at which the sulfur vapor is oversaturated in relation to the sulfur bath. By adjusting the injection depth of the carrier gas, the achieving of the saturation point of the sulfur vapor is optimized.

The behavior of sulfur vapor owing to overpressure possibly produced in the inner vessel should also be mentioned. In this case the small quantity of sulfur in the inner vessel is partially or totally mixed with the cold and considerably larger quantity of sulfur in the outer vessel, and as a result the overpressure in the inner vessel is substantially lowered.

The apparatus is in particular suitable for use in processes in which an elemental sulfur vapor with a high partial pressure is required. Such processes within the scope of use of the new apparatus include:

The breaking up of and rearranging of the structure of impure complex ores (Patent Application Ser. No. 587,662, now C.I.P. No. 808,993), Matrix changes of copper concentrates for leaching (U.S. Pat. No. 3,459,535).

Process for the control of sulfidization processes (Patent Application Ser. No. 973,433).

Further, the new apparatus is applicable to the production of elemental sulfur vapor for the production of certain sulfur compounds such as carbon sulfide, sulfur dioxide and sulfur halides ($S_2F_2$, $SF_2$, $SF_4$ $SF_6$, $S_2Cl_2$, $SCl_2$, $SCl_4$, $S_2Br_2$).

DESCRIPTION OF THE DRAWING

The invention is described below in more detail with reference to the accompanying drawing, which depicts a cross sectional side elevation of a preferred embodiment of the invention.

DESCRIPTION OF THE PREFERRED EMBODIMENT

The apparatus depicted in the accompanying drawing has two vessels 1 and 2, fitted one inside the other. The outer vessel 1 is heated by means of electric resistors 7 and has effective thermal insulation 6. In the upper section of the outer vessel 1 there is a pipe 5 for feeding elemental sulfur in solid state into the electrically heated outer vessel 1, the temperature of which is maintained considerably below the boiling point of sulfur.

The inner vessel 2 also has electric resistors 21 for heating the inner vessel, and it has been lined with thermal insulation 22 as has the outer vessel 1. At the bottom of the inner vessel 2 there is a centered opening 9 through which the outer vessel 1 and the inner vessel 2 are connected, thus forming communicating vessels. The inner vessel 2 works as a vaporizer, in which preheated nitrogen gas, fed through pipe 15 into the preheater 3 and from there further through pipe 16 into the inner vessel 2 and dispersed into the molten sulfur by means of a dispersing member 17, is saturated with molten sulfur. The obtained sulfur-bearing gas phase is removed from the inner vessel 2 through an outlet pipe 18 fitted in its upper section, into the heating device 4, where the sulfur-bearing gas is heated to the desired temperature and the desired degree of dissociation before it is discharged through pipe 20.

Owing to the poor thermal conductivity of molten sulfur the apparatus has been provided with a stirrer having a regulatable rotational velocity. The stirrer has a vertical shaft 14 which has been fitted through the top of the inner vessel and extends through the opening at the floor of the inner vessel 2 as far as the lower section of the outer vessel 1. In this way the same shaft 14 can drive both the stirrer 10 of the inner vessel 2 and the stirrer 8 of the outer vessel 1.

The inner vessel 2 and the outer vessel 1 have, furthermore, sensors 11 and 12 detecting the temperature of their contents. The effect of the thermal resistors 7 and 21 is controlled on the basis of the measured value obtained by the sensors 11 and 12. Furthermore, the inner container 2 has a bubbler piping 13 indicating the level of the molten sulfur.

The apparatus according to the invention yields certain significant advantages over prior known apparatuses. The apparatus operates at a low temperature and pressure in relation to the boiling point of sulfur. In addition, the apparatus can be easily used for producing a gas phase in which the partial pressure of sulfur varies within a wide range around one bar. The possibility of controlling the partial pressure of sulfur is necessary in, for example, the control of the sulfidization process. Owing to the poor thermal conductivity of sulfur the temperature in the outer vessel can be maintained considerably lower than that in the inner vessel. Thus it is easy to arrange the feeding of solid sulfur into the outer vessel. Finally, it should be noted that the structure of the apparatus is very simple and its space requirement small. For this reason the thermal losses are low, the vessels 1 and 2 being one inside the other and the temperature of the outer vessel 1 being low.

The invention is described below in more detail with the aid of examples.

EXAMPLE I

The vaporization of sulfur was carried out using a pilot-scale apparatus according to the figure. The diameter of the outer vessel 1 if the apparatus was 0.7 m and its height 0.6 m, and the respective dimensions of the inner vessel 2 were 0.3 m and 0.45 m (H/D=1.5). The inner vessel was thermally insulated on the outside by means of insulation mass 22 (50 mm). The total electric energy of the apparatus depicted was 17.2 Mcal/h, the share of the inner vessel 2 being 4.3 Mcal/h. The temperature in the outer vessel 1 was 340° C. and that in the inner vessel was 400° C. or 427° C., which was also the temperature of the preheated carrier gas (nitrogen). The thermal losses of the apparatus were 1.5 Mcal/h. The outer vessel 1 was filled to a 75% capacity.

The balances of heat and materials according to Example I at inner-vessel temperatures of 400° and 427° C. have been calculated for a sulfur vaporization rate of 50 kg/h. The partial pressures of saturated elemental sulfur vapor obtained from the apparatus were respectively 0.502 atm and 0.767 atm, and the average atomic numbers of the sulfur molecules were 6.71 and 6.63. The results are shown in Table 1 below.

EXAMPLE II

The industrial apparatus according to this example was dimensioned on the basis of the trial runs performed using the pilot apparatus. The ratio of the height of the inner vessel to its diameter was, however, encreased in comparison with the pilot apparatus. In order to achieve the saturation state of sulfur vapor, the height of the nitrogen injection pipes can be adjusted (optimization). The dimensions of the apparatus were as follows: outer vessel diameter 1.45 m and height 1.64 m and the respective dimensions of the inner vessel 0.62 m and 1.25 m (D/H=2.0). The total electric energy of the apparatus was 180.6 Mcal/h, out of which the share of the inner vessel was 86 Mcal/h and the thermal losses 5 Mcal/h. The vaporization capacity of the apparatus was 1000 kg S/h.

If the process requires a considerably larger quantity of sulfur vapor, it is advantageous to construct, instead of one large inner vessel, two or more inner vessels in one outer vessel, and the gases obtained from these inner vessels are combined outside the apparatus.

TABLE 1

| Balance component | Balance I ($P_{sv}$ = 0.502 atm, $\bar{v}$ = 6.71) | | | Balance II ($P_{sv}$ = 0.767 atm, $\bar{v}$ 6.67) | | |
|---|---|---|---|---|---|---|
| | Amount of material kg/h | Temperature °C. | Amount of heat Mcal/h | Amount of material kg/h | Temperature °C. | Amount of heat Mcal/h |
| In | | | | | | |
| Sulfur | 50 | 25 | 0 | 50 | 25 | 0 |
| Nitrogen | 6.468 | 400 | 0.595 | 2.003 | 427 | 0.199 |
| Electric energy | — | — | 10.133 | — | — | 10.398 |
| Total | 56.468 | — | 10.728 | 52.003 | — | 10.597 |
| Out | | | | | | |
| Sulfur (g) | 50 | 400 | 8.633 | 50 | 427 | 8.898 |
| Nitrogen | 6.468 | 400 | 0.595 | 2.003 | 427 | 0.199 |
| Thermal losses | — | — | 1.5 | — | — | 1.5 |
| Total | 56.468 | — | 10.728 | 52.003 | — | 10.597 |

What is claimed is:

1. An apparatus for the vaporization of elemental sulfur by means of a carrier gas, comprising: a thermally insulated first vessel for the melting of elemental sulfur, provided with heating means, a stirrer and an inlet pipe for elemental sulfur; and at least one second vessel inside the first vessel and communicating with said first vessel, said second vessel being provided with heating means, a stirrer, means for feeding carrier gas and an outlet pipe for sulfur vapors, for vaporizing the molten elemental sulfur flowing from the first vessel by means of carrier gas.

2. The apparatus of claim 1, in which a bottom of the second vessel has an opening for directing the elemental sulfur melted in the first vessel into the second vessel situated inside it.

3. The apparatus of claim 2, in which the stirrers of the first vessel and the second vessel have been mounted on the same shaft, which extends from the second vessel through the opening at its bottom into the first vessel.

4. The apparatus of claim 1, further comprising a heating device fitted in the carrier-gas feeding pipe for the preheating of the carrier gas before it is fed below the surface of the molten elemental sulfur in the second vessel.

5. The apparatus of claim 1, further comprising a heating device fitted in the sulfur-vapor outlet pipe for heating the sulfur vapors to the desired temperature and the desired degree of dissociation.

* * * * *

UNITED STATES PATENT AND TRADEMARK OFFICE
CERTIFICATE OF CORRECTION

PATENT NO. : 4,266,512
DATED : May 12, 1981
INVENTOR(S) : Pekka T. Setala et al

It is certified that error appears in the above-identified patent and that said Letters Patent are hereby corrected as shown below:

Column 2, line 36:

"$\Delta He \times f =$" should be --$\Delta He + f =$--.

Signed and Sealed this

Eighth Day of September 1981

[SEAL]

Attest:

GERALD J. MOSSINGHOFF

Attesting Officer     Commissioner of Patents and Trademarks